US009396296B2

(12) United States Patent
Mangat et al.

(10) Patent No.: US 9,396,296 B2
(45) Date of Patent: Jul. 19, 2016

(54) SYSTEM AND METHOD FOR COMPUTING THERMAL BOUNDARY CONDITIONS FROM AN UNSTRUCTURED CFD SIMULATION ON STRUCTURAL COMPONENTS

(75) Inventors: Vikram Singh Mangat, Bangalore (IN); Jose-Angel Hernanz Manrique, Madrid (ES); Madhusudana Reddy, Bangalore (IN); Punit Tiwari, Bangalore (IN); Shreesh Mishra, Bangalore (IN); Sunil Kumar, Bangalore (IN); Sandhya Jha, Bangalore (IN)

(73) Assignee: AIRBUS ENGINEERING CENTRE INDIA, Bangalore, Karnataka (IN)

( * ) Notice: Subject to any disclaimer, the term of this patent is extended or adjusted under 35 U.S.C. 154(b) by 741 days.

(21) Appl. No.: 13/592,374

(22) Filed: Aug. 23, 2012

(65) Prior Publication Data

US 2013/0060541 A1 Mar. 7, 2013

(30) Foreign Application Priority Data

Sep. 5, 2011 (IN) .............................. 3058/CHE/2011

(51) Int. Cl.
*G06F 7/60* (2006.01)
*G06F 17/10* (2006.01)
*G06F 17/50* (2006.01)

(52) U.S. Cl.
CPC ........ *G06F 17/5018* (2013.01); *G06F 17/5009* (2013.01); *G06F 17/5095* (2013.01); *G06F 2217/16* (2013.01); *G06F 2217/80* (2013.01)

(58) Field of Classification Search
CPC ............ G06F 17/5018; G06F 17/5009; G06F 17/5095; G06F 2217/80; G06F 2217/16
USPC .................................................. 703/2, 9, 8, 6
See application file for complete search history.

(56) References Cited

U.S. PATENT DOCUMENTS

| 7,996,195 B1 | 8/2011 | Plaia et al. | |
| 2002/0177985 A1* | 11/2002 | Kraft et al. | 703/7 |
| 2008/0126038 A1* | 5/2008 | Alvarez et al. | 703/6 |

FOREIGN PATENT DOCUMENTS

GB 2427046 A 12/2006

OTHER PUBLICATIONS

Zittzmann, Tobias et al., "Simulation of Steady-State Natural Convection Using CFD", Aug. 15-18, 2005, Ninth International IBPSA Conference.*

(Continued)

*Primary Examiner* — Kamini S Shah
*Assistant Examiner* — Cedric D Johnson
(74) *Attorney, Agent, or Firm* — Prakash Nama; Global IP Services, PLLC

(57) ABSTRACT

A system and method for computing thermal boundary conditions from an unstructured computational fluid dynamics (CFD) simulation for a thermal simulation of a structural component are disclosed. The thermal boundary conditions include convective heat transfer coefficient (HTC) and reference temperature ($T_{ref}$). In one embodiment, prism cells are formed to capture boundary layer substantially next to a wall of the structural component. Further, tetrahedral cells are formed to capture a diffused temperature layer substantially next to the formed last prism cell and in a direction normal to the wall. Furthermore, temperature of each of the prism cells is computed in the direction normal to the wall until a substantially first tetrahedral cell. In addition, the computed temperature of the prism cell that is substantially adjacent to the first tetrahedral cell is declared as the $T_{ref}$. Also, the HTC is computed using the obtained $T_{ref}$.

9 Claims, 6 Drawing Sheets

(56) References Cited

OTHER PUBLICATIONS

Wu, Zhiyong et al., "Numerical Simulation of Convective Heat Transfer Between Air Flow and Ceramic Foams to Optimize Volumetric Solar Air Receiver Performances", Mar. 2011, International Journal of Heat and Mass Transfer, Elsevier Ltd.*

Search Report of United Kingdom—Application No. GB1118087.4—Search date Mar. 1, 2012.

* cited by examiner

SYSTEM AND METHOD FOR COMPUTING THERMAL BOUNDARY CONDITIONS FROM AN UNSTRUCTURED CFD SIMULATION ON STRUCTURAL COMPONENTS

RELATED APPLICATIONS

Benefit is claimed under 35 U.S. 119(a)-(d) to Indian Application Serial No. 3058/CHE/2011 entitled "SYSTEM AND METHOD FOR COMPUTING THERMAL BOUNDARY CONDITIONS FROM AN UNSTRUCTURED CFD SIMULATION ON STRUCTURAL COMPONENTS" filed on Sep. 5, 2011 by Airbus Engineering Centre India.

FIELD OF TECHNOLOGY

Embodiments of the present subject matter relate to computer simulation, and more particularly, to computing thermal boundary conditions from an unstructured computational fluid dynamics (CFD) simulation for a thermal simulation on structural components.

BACKGROUND

Typically, a thermal simulation on a structural component requires imposition of thermal boundary conditions, such as convective heat transfer coefficient (HTC) and reference temperature ($T_{ref}$) in order to model a convective heat flux from structure to fluid. The convective HTC is generally closely related with flow Reynolds number, flow geometry and thermal conditions on a heat transfer surface of the structural component. To define the convective HTC, the $T_{ref}$ is needed besides a wall temperature ($T_W$), an area (A) and a heat flux (q). Selection of the $T_{ref}$ for different flow settings, including film cooling, jet impingement with cross flows and mixing flow in a straight duct with or without internal heat source and so on can vary significantly. Typically, an unstructured computational fluid dynamics (CFD) simulation is carried out on fluid part of structural domain to determine the convective HTC and $T_{ref}$, which are then used in the thermal simulation of the structural component.

However, it is typically a very difficult task to determine the convective HTC and $T_{ref}$ from unstructured CFD simulation results. Existing techniques use physical reasoning, post processing of the unstructured CFD simulation results and/or prior knowledge of a range of expected values. For example, if fluid flow in the structural component is dominated by natural convection, then expected convective HTC can have a range of 0 to <10 W/m^2K. Further, thermal stratification based on vertical coordinate is expected. Based on the prior knowledge, simulation domain of the structural component is usually split into vertical components. Then an average of the split structural component is determined and used as the $T_{ref}$ in an equation, such as the one below to compute the convective HTC as the values of A, $T_w$ and q are known.

$$HTC = \frac{q}{A(Tw - Tref)}$$

Wherein, HTC is convective heat transfer coefficient (W/m^2K), A is area (m^2), $T_w$ is wall or surface temperature (K or C), q is a heat flux and $T_{ref}$ is reference temperature (K or C).

The above existing techniques analyze difference zones of the structural component manually and identify dominant type of heat transfer mechanism, for example, natural convection, mixed convection, jet impingement and so on. These techniques are based on subjective process.

SUMMARY

A system and method for computing thermal boundary conditions from an unstructured computational fluid dynamics (CFD) simulation on structural components are disclosed. According to one aspect of the present subject matter, the method for computing the thermal boundary conditions, such as convective heat transfer coefficient (HTC) and reference temperature ($T_{ref}$) includes forming prism cells to capture a boundary layer substantially next to a wall of a structural component. Further, forming tetrahedral cells to capture a diffused temperature layer substantially next to the formed last prism cell and in a direction normal to the wall. Furthermore, computing temperature of each of the prism cells in the direction normal to the wall until a substantially first tetrahedral cell. In addition, computing temperature gradients between the prism cells.

Also, a check is made to determine whether there is a reverse in temperature gradient in any of the computed temperature gradients. Further, declaring the temperature of the prism cell that is substantially previous to the prism cell associated with the reverse in the temperature gradient as the $T_{ref}$, if there is a reverse in the temperature gradient. Furthermore, declaring the computed temperature of the prism cell that is substantially adjacent to the first tetrahedral cell as the $T_{ref}$, if there is no reverse in the temperature gradient. In addition, computing the convective HTC using the obtained $T_{ref}$.

According to another aspect of the present subject matter, the system to compute the thermal boundary conditions from the unstructured CFD simulation on the structural component includes a processor and memory coupled to the processor. Further, the memory includes a simulation module. In one embodiment, the simulation module includes instructions to perform the method described above.

According to yet another aspect of the present subject matter, a non-transitory computer-readable storage medium for computing the thermal boundary conditions from the unstructured CFD simulation on the structural component, having instructions that, when executed by a computing device causes the computing device to perform the method described above.

The system and method disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method to compute thermal boundary conditions from an unstructured computational fluid dynamics (CFD) simulation of structural components are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
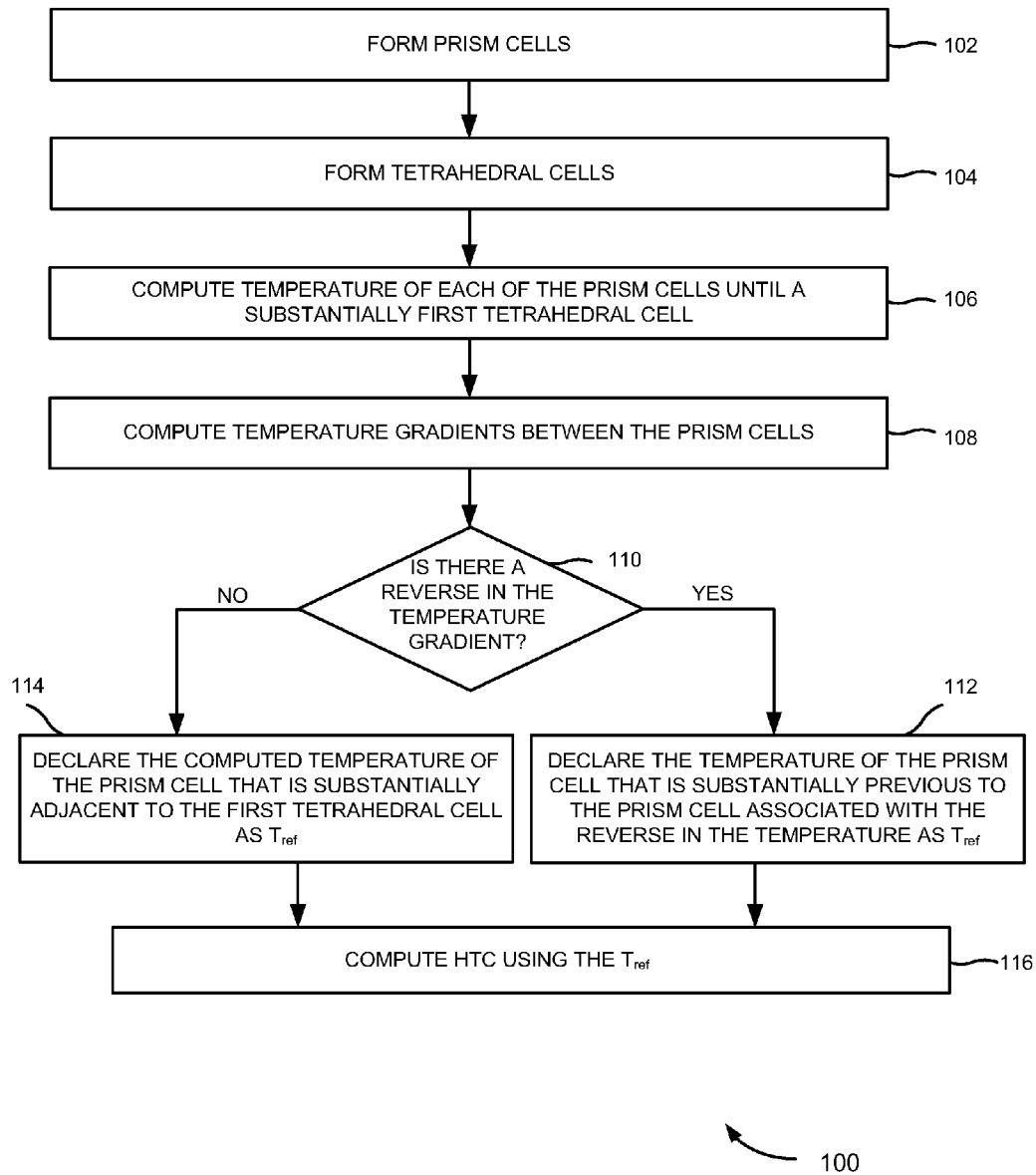
FIG. 1 illustrates a flow diagram of a method to compute thermal boundary conditions from an unstructured computational fluid dynamics (CFD) simulation for a thermal simulation of structural component, according to an embodiment.

FIG. 1 illustrates a flow diagram 100 of a method to compute thermal boundary conditions from an unstructured CFD simulation for a thermal simulation of a structural component. For example, the thermal boundary conditions include convective heat transfer coefficient (HTC) and reference temperature ($T_{ref}$). At block 102, prism cells are formed to capture a boundary layer substantially next to a wall of the structural component. At block 104, tetrahedral cells are formed to capture a diffused temperature layer substantially next to the formed last prism cell and in a direction normal to the wall. This is explained in more detail with reference to FIG. 3. At block 106, temperature of each of the prism cells is computed in the direction normal to the wall until a substantially first tetrahedral cell. At block 108, temperature gradients between the prism cells are computed. This is explained in more detail with reference to FIG. 4.

At block 110, a check is made to determine whether there is a reverse in temperature gradient in any of the computed temperature gradients. If there is a reverse in the temperature gradient, at block 112, the temperature of the prism cell that is substantially previous to the prism cell associated with the reverse in the temperature gradient is declared as the $T_{ref}$. If there is no reverse in the temperature gradient, at block 114, the computed temperature of the prism cell that is substantially adjacent to the first tetrahedral cell is declared as the $T_{ref}$. This is explained in more detail with reference to FIG. 5.

At block 116, the convective HTC is computed using the $T_{ref}$. In one embodiment, the convective HTC is computed using equation:

$$HTC = \frac{q}{A(Tw - Tref)}$$

wherein,
A is area (m^2),
q is heat flux,
$T_w$ is wall temperature (K or C), and
$T_{ref}$ is the computed temperature (K or C) of the substantially first tetrahedral cell or temperature of the prism cell that is substantially previous to the prism cell associated with the reverse in the temperature gradient.

Figure 2:
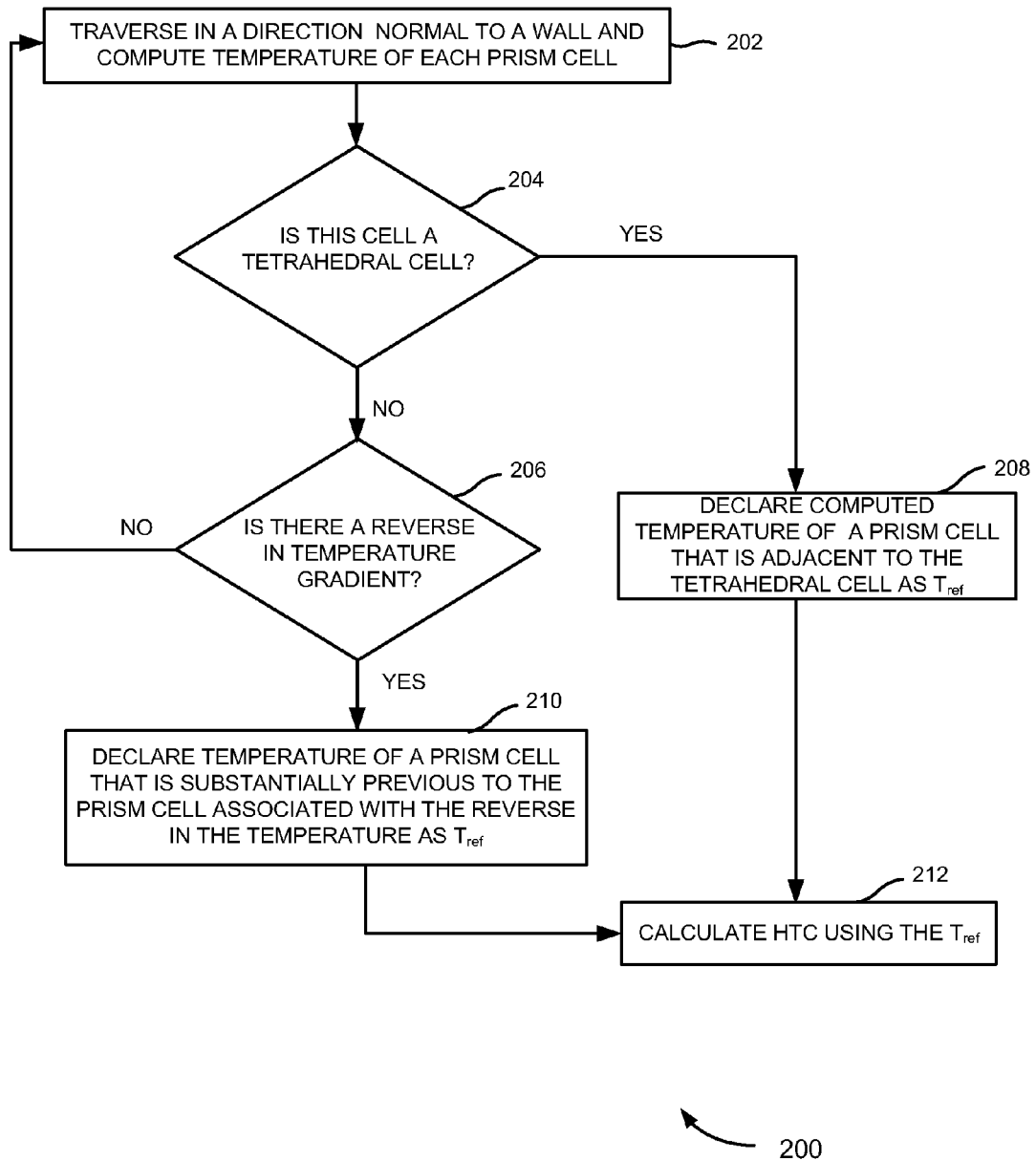
FIG. 2 illustrates another flow diagram of a method to compute the thermal boundary conditions from the unstructured CFD simulation for the thermal simulation of the structural component, according to an embodiment.

Referring now to FIG. 2, another flow diagram 200 illustrates a method to compute thermal boundary conditions from an unstructured CFD simulation for a thermal simulation of a structural component, according to an embodiment. For example, the thermal boundary conditions include convective HTC and $T_{ref}$. In this embodiment, the convective HTC and Tref is computed for a wall in the structural component. The wall is one of the walls in the structural component. At block 202, temperature of each prism cell is measured by traversing in a direction normal to the wall in the structural component. The formation of prism cells is explained in more detail with reference to FIG. 3.

At block 204, a check is made to determine whether the cell is a tetrahedral cell. If the cell is the tetrahedral cell, at block 208, the computed temperature of a last prism cell that is adjacent to the tetrahedral cell is declared as the $T_{ref}$. If the cell is not the tetrahedral cell, at block 206, a check is made to determine whether there is a reverse in a temperature gradient. If there is a reverse in the temperature gradient, at block 210, temperature of a prism cell that is substantially previous to the prism cell associated with the reverse in the temperature gradient is declared as $T_{ref}$. If there is no reverse in the temperature gradient, then, the process steps are repeated from the block 202. At block 212, the convective HTC is computed using the obtained $T_{ref}$. Further, the process steps are repeated from the block 202 for each of the walls in the structural component. This is explained in more detail with reference to FIG. 1.

Figure 3:
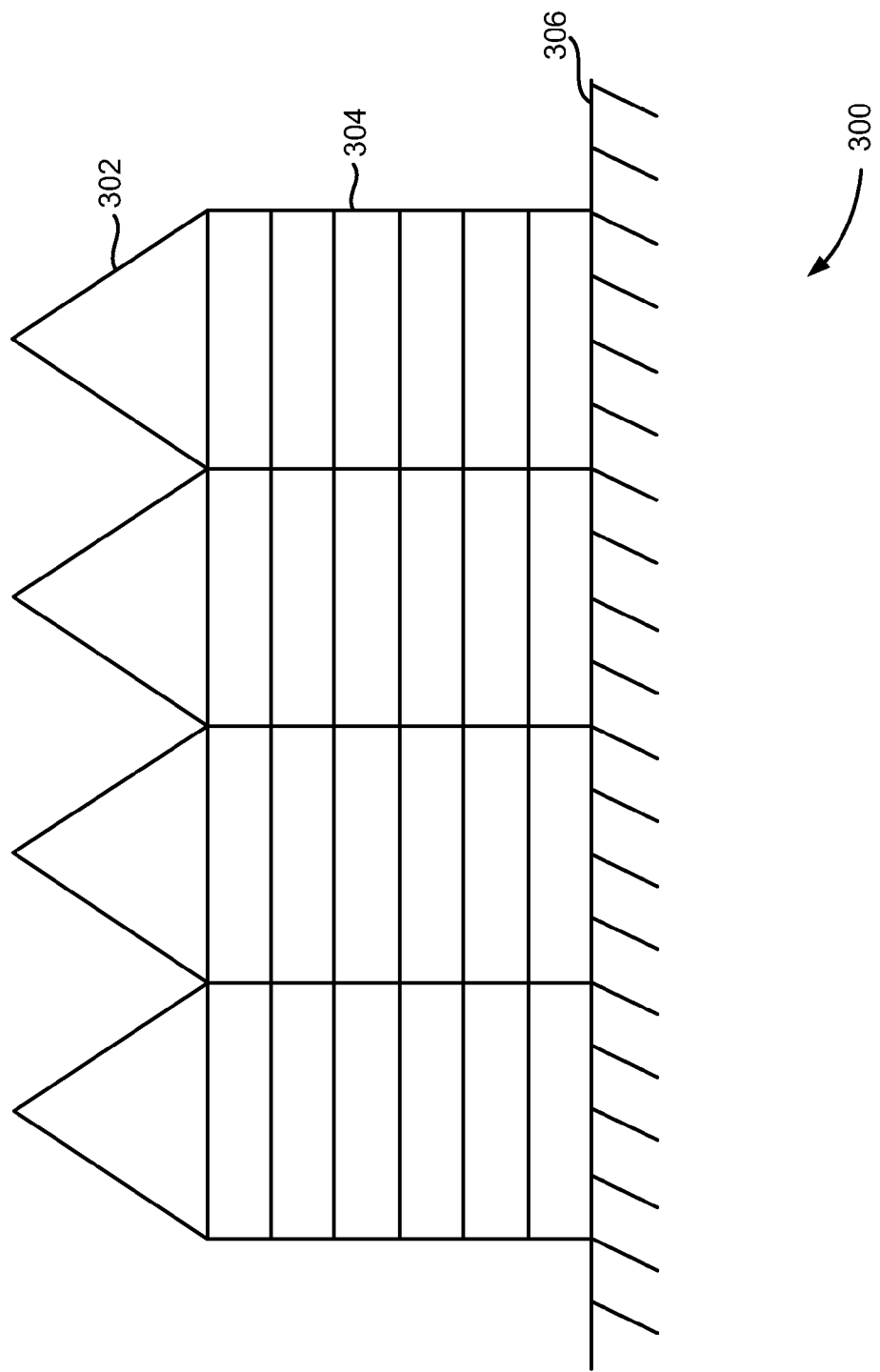
FIG. 3 illustrates prism cells and tetrahedral cells from a wall into domain of the structural component, according to one embodiment.

Referring now to FIG. 3, which illustrates prism cells 304 and tetrahedral cells 302 from a wall 306 into a domain of a structural component 300, according to one embodiment. For example, the wall 306 is one of the walls of the structural component. Further, the prism cells 304 are formed to capture a boundary layer substantially next to the wall 306 of the structural component. Furthermore, the tetrahedral cells 302 are formed to capture a diffused temperature layer substantially next to a last prism cell in the formed prism cells 304 and in a direction normal to the wall 306.

In one exemplary implementation, the prism cells 304 and the tetrahedral cells 302 are formed by performing the unstructured CFD simulation on the structural component. Further, temperature of each of the prism cells 304 and each of the tetrahedral cells 302 are obtained from the unstructured CFD simulation. The obtained temperature of each of the prism cells 304 and each of the tetrahedral cells 302 is explained in more detail with reference to FIG. 4. Furthermore, the prism cells 304 and the tetrahedral cells 302 are used in computing the thermal boundary conditions of the structural component. The process of computing the thermal boundary conditions is explained in more detail with reference to FIGS. 1 and 2. In addition, the computed thermal boundary conditions are used in performing the thermal simulation on the structural component.

Figure 4:
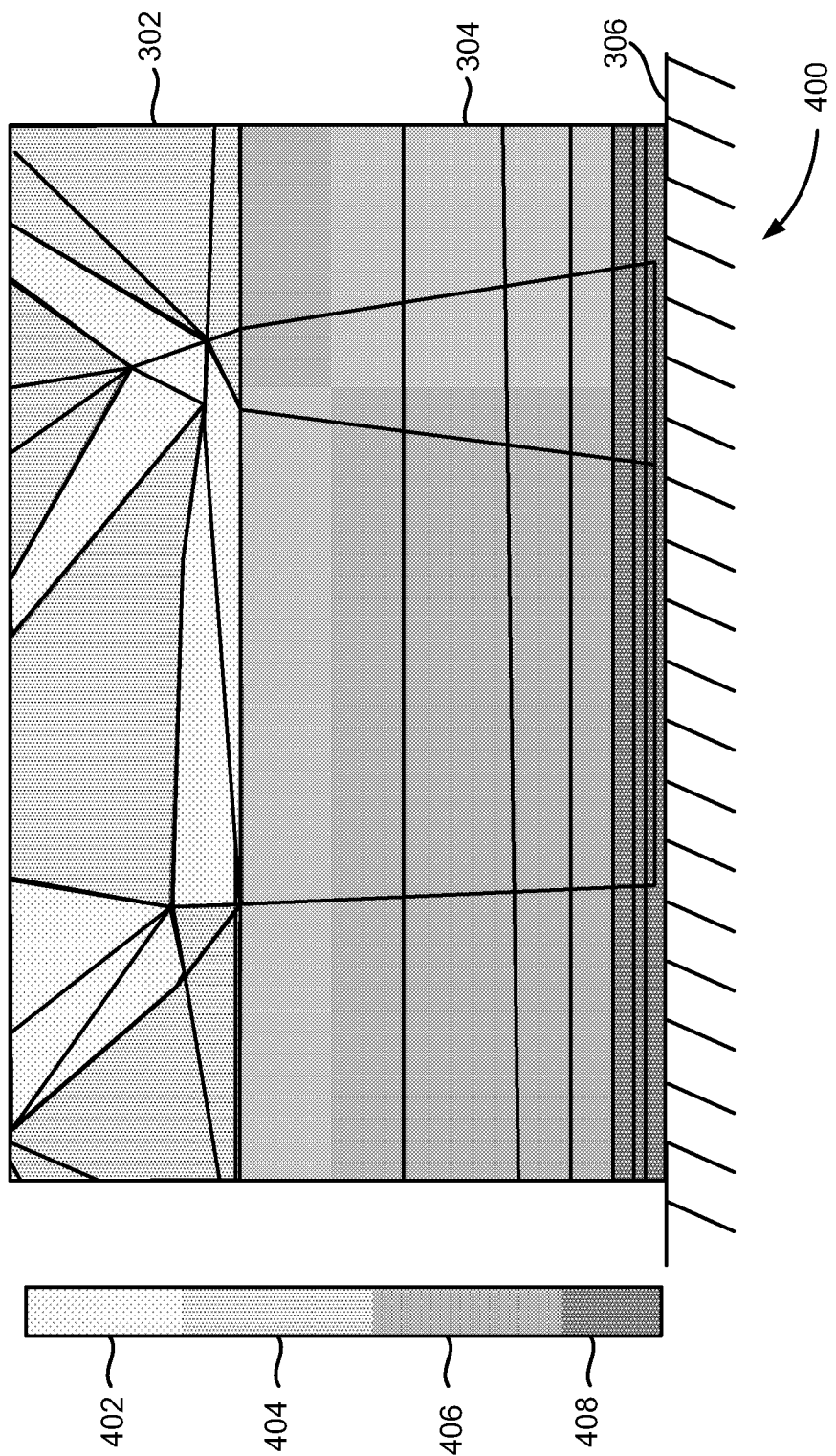
FIG. 4 illustrates a temperature gradient occurring in the prism cells and the tetrahedral cells of the structural component, according to one embodiment.

Referring now to FIG. 4, a temperature gradient occurring, in the prism cells 304 and the tetrahedral cells 302 of a structural component 400 is illustrated, according to one embodiment. Particularly, FIG. 4 illustrates temperature of each of the prism cells 304 and the tetrahedral cells 302 which are obtained from the unstructured CFD simulation. As shown in FIG. 4, the temperature of each of the prism cells 304 and the tetrahedral cells 302 gradually changes from the wall 306 into the domain of the structural component.

In one embodiment, the temperature of each of the prism cells 304 and each of the tetrahedral cells 302 is indicated using different shades. As shown in FIG. 4, a darker shade 408 indicates a higher temperature and lighter shades 402, 404 and 406 indicate lower temperatures. Further as shown in FIG. 4, temperature of some of the prism cells 304 next to the wall 306 is high which is indicated using the darker shade 408. Furthermore as shown in FIG. 4, the prism cells 304 indicated using the lighter shade 406 have a lower temperature compared to the some of the prism cells 304 next to the wall 306. The decrease in temperature is due to diffusion of heat from the wall 306 into the domain of the structural component in the direction normal to the wall 306. In addition as shown in FIG. 4, the temperature tends to diffuse in the tetrahedral cells 302 which is indicated using the shades 404 and 402. The temperature gradients of the prism cells 304 and the tetrahedral cells 302, shown in FIG. 4, are used to compute the thermal boundary conditions of the structural component. This is explained in more detail with reference to FIG. 5.

Figure 5:
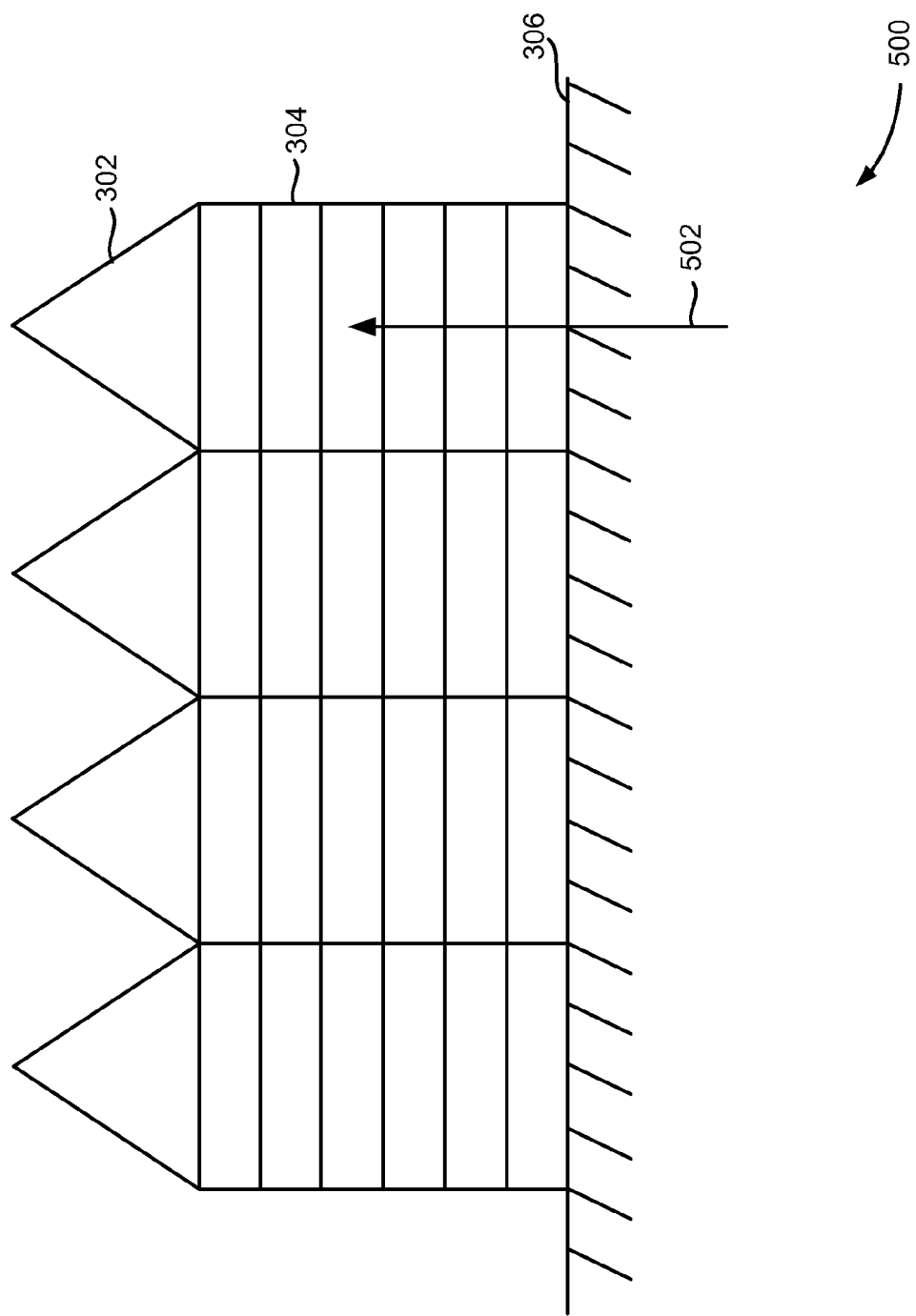
FIG. 5 illustrates using the prism cells and the tetrahedral cells from the wall into the domain of the structural component to determine reference temperature ($T_{ref}$), according to one embodiment.

Referring now to FIG. 5, which illustrates using the prism cells 304 and the tetrahedral cells 302 from the wall 306 into the domain of a structural component 500 to determine the $T_{ref}$ according to one embodiment. Particularly, FIG. 5 illustrates the prism cells 304 and the tetrahedral cells 302 formed in the structural component using the unstructured CFD simulation. This is explained in more detail with reference to FIG. 3. The arrow 502, shown in FIG. 5, indicates the direction normal to the wall 306 of the structural component. Further, the arrow 502 indicates the direction in which each of the walls in the structural component is traversed to determine the $T_{ref}$. This is explained in more detail with reference to FIGS. 1 and 2.

Figure 6:
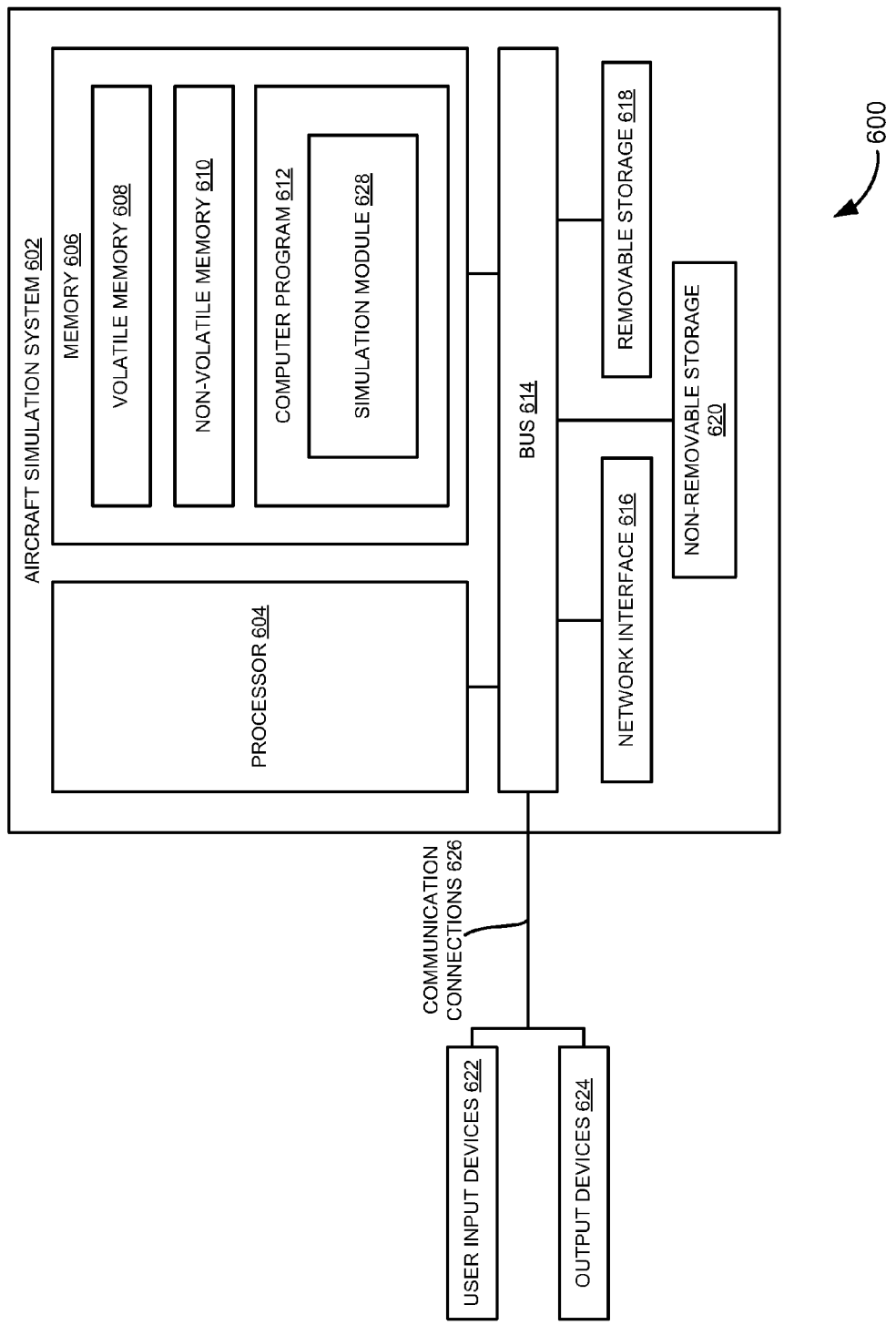
FIG. 6 illustrates a system including a simulation module for computing the thermal boundary conditions from the unstructured CFD simulation for the thermal simulation of the structural component, using the process shown in FIGS. 1 and 2, according to one embodiment.

Now referring to FIG. 6, which illustrates an aircraft simulation system 602 including a simulation module 628 to compute the thermal boundary conditions from the unstructured CFD simulation for the thermal simulation of the structural component, using the processes shown in FIGS. 1 and 2, according to one embodiment. FIG. 6 and the following discussions are intended to provide a brief, general description of a suitable computing environment in which certain embodiments of the inventive concepts contained herein are implemented.

The aircraft simulation system 602 includes a processor 604, memory 606, a removable storage 618, and a non-removable storage 620. The aircraft simulation system 602 additionally includes a bus 614 and a network interface 616. As shown in FIG. 6, the aircraft simulation system 602 includes access to the computing system environment 600 that includes one or more user input devices 622, one or more output devices 624, and one or more communication connections 626 such as a network interface card and/or a universal serial bus connection.

Exemplary user input devices 622 include a digitizer screen, a stylus, a trackball, a keyboard, a keypad, a mouse and the like. Exemplary output devices 624 include a display unit of the personal computer, a mobile device, and the like. Exemplary communication connections 626 include a local area network, a wide area network, and/or other network.

The memory 606 further includes volatile memory 608 and non-volatile memory 610. A variety of computer-readable storage media are stored in and accessed from the memory elements of the aircraft simulation system 602, such as the volatile memory 608 and the non-volatile memory 610, the removable storage 618 and the non-removable storage 620. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 604, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 604 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 604 of the aircraft simulation system 602. For example, a computer program 612 includes machine-readable instructions capable of computing the thermal boundary conditions, such as the convective HTC and $T_{ref}$ from the unstructured CFD simulation for the thermal simulation of the structural component in the aircraft simulation system 602, according to the teachings and herein described embodiments of the present subject matter. In one embodiment, the computer program 612 is included on a compact disk-read only memory (CD-ROM) and loaded from the CD-ROM to a hard drive in the non-volatile memory 610. The machine-readable instructions cause the aircraft simulation system 602 to encode according to the various embodiments of the present subject matter.

As shown, the computer program 612 includes a simulation module 628. For example, the simulation module 628 can be in the form of instructions stored on a non-transitory computer-readable storage medium. The non-transitory computer-readable storage medium having the instructions that, when executed by the simulation module 628, causes the aircraft simulation system 602 to perform the one or more methods described in FIGS. 1 through 5.

In various embodiments, system and method described in FIGS. 1 through 5 propose a generalized approach for computing the thermal boundary conditions from the unstructured CFD simulation for the thermal simulation of the structural component. For computing the thermal boundary conditions, temperature of each of the prism cells and the tetrahedral cells, obtained from the unstructured CFD simulation, are considered. Hence, time required for computing the thermal boundary conditions is reduced. Further, manual effort for computing the thermal boundary conditions is reduced.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A computer implemented method to compute thermal boundary conditions from an unstructured computational fluid dynamics (CFD) simulation for a thermal simulation of a structural component, comprising:
   forming prism cells to capture a boundary layer next to a wall of the structural component;
   forming tetrahedral cells to capture a diffused temperature layer next to the formed last prism cell and in a direction normal to the wall;
   computing temperature of each of the prism cells in the direction normal to the wall until a first tetrahedral cell;
   declaring the computed temperature of one of the prism cells as reference temperature ($T_{ref}$) by:
      computing temperature gradients between the prism cells;
      determining whether there is a reverse in temperature gradient in any of the computed temperature gradients; and
      if so, declaring the temperature of another prism cell that is previous and adjacent to a prism cell associated with the reverse in the temperature gradient as the $T_{ref}$;
   computing convective heat transfer coefficient (HTC) using the $T_{ref}$, wherein the thermal boundary conditions comprise at least one of the $T_{ref}$ and convective HTC; and
   performing the thermal simulation of the structural component using the thermal boundary conditions.

2. The method of claim 1, further comprising:
   if not, declaring the computed temperature of the formed last prism cell that is adjacent to the first tetrahedral cell as the $T_{ref}$.

3. The method of claim 2, wherein the convective HTC is computed using equation:

$$HTC = \frac{q}{A(Tw - Tref)}$$

wherein, A is area (m^2), $T_w$ is wall temperature (K or C), q is heat flux and $T_{ref}$ is computed temperature (K or C) of the formed last prism cell that is adjacent to the first tetrahedral cell or temperature of the other prism cell that is previous and adjacent to the prism cell associated with the reverse in the temperature gradient.

4. A system to compute thermal boundary conditions from an unstructured computational fluid dynamics (CFD) simulation for a thermal simulation of a structural component, comprising:
   a processor; and
   memory coupled to the processor, wherein the memory includes a simulation module having instructions to:
      form prism cells to capture a boundary layer next to a wall of the structural component;
      form tetrahedral cells to capture a diffused temperature layer next to the formed last prism cell and in a direction normal to the wall;
      compute temperature of each of the prism cells in the direction normal to the wall until a first tetrahedral cell;
      declare the computed temperature of one of the prism cells as reference temperature ($T_{ref}$) by:
         computing temperature gradients between the prism cells;
         determining whether there is a reverse in temperature gradient in any of the computed temperature gradients; and
         if so, declaring the temperature of another prism cell that is previous and adjacent to a prism cell associated with the reverse in the temperature gradient as the $T_{ref}$;
      compute convective heat transfer coefficient (HTC) using the $T_{ref}$, wherein the thermal boundary conditions comprise at least one of the $T_{ref}$ and convective HTC; and
      perform the thermal simulation of the structural component using the thermal boundary conditions.

5. The system of claim 4, wherein the simulation module further having instructions to
   if not, declare the computed temperature of the formed last prism cell that is adjacent to the first tetrahedral cell as the $T_{ref}$.

6. The system of claim 5, wherein the convective HTC is computed using equation:

$$HTC = \frac{q}{A(Tw - Tref)}$$

wherein, A is area (m^2), $T_w$ is wall temperature (K Or C), q is heat flux and $T_{ref}$ is computed temperature (K or C) of the formed last prism cell that is adjacent to the first tetrahedral cell of temperature of the other prism cell that is previous and adjacent to the prism cell associated with the reverse in the temperature gradient.

7. A non-transitory computer-readable storage medium to compute thermal boundary conditions from an unstructured computational fluid dynamics (CFD) simulation for a thermal simulation of a structural component having instructions that, when executed by a computing device, cause the computing device to:
   form prism cells to capture a boundary layer next to a wall of the structural component;
   form tetrahedral cells to capture a diffused temperature layer next to the formed last prism cell and in a direction normal to the wall;
   compute temperature of each of the prism cells in the direction normal to the wall until a first tetrahedral cell;
   declare the computed temperature of one of the prism cells as reference temperature ($T_{ref}$) by:
      computing temperature gradients between the prism cells;
      determining whether there is a reverse in temperature gradient in any of the computed temperature gradients; and
      if so, declaring the temperature of another prism cell that is previous and adjacent to a prism cell associated with the reverse in the temperature gradient as the $T_{ref}$;

compute convective heat transfer coefficient (HTC) using the $T_{ref}$ wherein the thermal boundary conditions comprise at least one of the $T_{ref}$ and convective HTC; and perform the thermal simulation of the structural component using the thermal boundary conditions.

8. The non-transitory computer-readable storage medium of claim 7, further comprising:

if not, declaring the computed temperature of the formed last prism cell that is adjacent to the first tetrahedral cell as the $T_{ref}$.

9. The non-transitory computer-readable storage medium of claim 8, wherein the convective HTC is computed using equation:

$$HTC = \frac{q}{A(Tw - Tref)}$$

wherein, A is area (m^2), $T_w$ is wall temperature (K or C), q is heat flux and $T_{ref}$ is computed temperature (K or C) of the formed last prism cell that is adjacent to the first tetrahedral cell or temperature of the other prism cell that is previous and adjacent to the prism cell associated with the reverse in the temperature gradient.

* * * * *